United States Patent [19]

Boonstra et al.

[11] 4,303,742

[45] Dec. 1, 1981

[54] RESISTANCE MATERIAL

[75] Inventors: Alexander H. Boonstra; Cornelis A. H. A. Mutsaers, both of Eindhoven, Netherlands

[73] Assignee: U.S. Philips Corporation, New York, N.Y.

[21] Appl. No.: 127,347

[22] Filed: Mar. 5, 1980

[30] Foreign Application Priority Data

Mar. 8, 1979 [NL] Netherlands ........................ 7901863

[51] Int. Cl.[3] ........................... B32B 9/04; H01B 1/06

[52] U.S. Cl. .................................... 428/697; 428/432; 428/702; 252/521; 252/518; 423/593

[58] Field of Search ....................... 252/518, 514, 521; 428/539, 432; 423/593

[56] References Cited

U.S. PATENT DOCUMENTS

| | | | |
|---|---|---|---|
| 3,553,109 | 11/1971 | Hoffman | 423/593 |
| 3,681,262 | 8/1972 | Bouchard | 252/521 |
| 4,107,387 | 8/1978 | Boonstra | 428/539 |

*Primary Examiner*—George F. Lesmes
*Assistant Examiner*—E. Rollins Buffalow
*Attorney, Agent, or Firm*—Marc D. Schechter

[57] ABSTRACT

Resistance material comprising a mixture of metal oxidic compounds, metal oxides, a permanent binder and a temporary binder, the resistance-determining component consisting of at least one component having the formula $M_xSr_{1-x}Rh_2O_{4-4.5}$ in which M is selected from Pb and Bi and wherein $\frac{1}{2}>x>0$. By combining this component with a material having an opposite TCR, a resistor having a very small TCR is obtained. This resistor is formed by firing this resistance material on a substrate.

8 Claims, No Drawings

RESISTANCE MATERIAL

BACKGROUND OF THE INVENTION

The invention relates to a resistance material comprising a mixture of permanent and temporary binders and a metal rhodate resistance-determining component. The invention also relates to a resistor having a resistor body provided with leads, the resistor body having been produced by heating a substrate bearing such a resistance material so as to remove the temporary binder.

U.K. Pat. No. 1,535,139 (U.S. Pat. No. 4,107,387) describes such a resistance material in which the resistance-determining component is a metal rhodate having a composition defined by the formula $M_3'Rh_7O_{15}$, M' preferably being Pb or Sr.

Compared to many oxidic compounds previously suggested for use as the resistance-determining compound in resistance materials, this compound has the advantage that it is a completed-reaction product which, with a permanent binder and, possibly, together with another resistance-determining component having a different temperature dependence of resistance, can be processed in a simple manner on a suitable substrate to form a resistor body. Prior to the development of these resistance materials, resistance pastes were available in which the resistance-determining component was not obtained until the paste had been fired on a substrate, a noble metal oxide reacting during the firing process with a vitreous binder, for example a lead oxide glass, which noble metal oxide and vitreous binder were present in the paste. This required a rather long firing time (for example half an hour) at a relatively high temperature (approximately 800° C.).

A further advantage of the above-mentioned $M_3'Rh_7O_{15}$ materials is the small negative temperature coefficient of resistance (TCR) of these materials, which temperature behavior is rare. Combining one of these materials with a material having a linear, positive temperature coefficient of resistance (which materials are much commoner than negative TCR materials) makes it possible to produce resistors having a very low TCR ($/TCR/<100\times10^{-6}/°C.$) in a temperature range from −100− to +200° C.

SUMMARY OF THE INVENTION

The invention provides a rhodate type resistance-determining material having a linear, positive TCR, which can be combined with a material having a linear negative TCR to form resistors having a low TCR ($TCR<100\times10^{-6}/°C.$). The invention also provides material with the same crystal structure having a linear negative TCR, which increases the number of possible permutations.

The resistance material according to the invention is characterized in that the resistance-determining component predominantly consists of at least one compound having the formula $M_xSr_{1-x}Rh_2O_{4-4.5}$ wherein M is selected from Pb and Bi and wherein $\frac{1}{2}>X>0$.

Both the Pb and the Bi compounds have a hexagonal crystal structure with an a-axis of 20.2 Å and a c-axis of 3.1 Å. This hexagonal crystal structure and the elementary cells are quite different from those of the $M_3'Rh_7O_{15}$ compounds.

The oxygen content of the compound $M_xSr_{1-x}Rh_2O_{4-4.5}$ is between 4 and 4.5 atoms per molecule, depending on the ratio of Pb:Sr and Bi:Sr, respectively, the different valencies of Pb and Bi being responsible for this range.

Preferably, x in the above-mentioned formula satisfies $0.45>X>0.05$.

Surprisingly, it was found that the Pb-Sr-rhodate, which has a completely different crystal structure and a completely different elementary cell than the above-mentioned known metal rhodates, has a positive linear TCR, whereas the Bi-Sr-rhodate has a linear negative TCR.

A further advantage of the above-mentioned resistance-determining components of $M_xSr_{1-x}Rh_2O_{4-4.5}$ is that they form long, acicular crystals. When the resistor body is formed from this rhodate these needles will be distributed randomly. The area of contact in a material having such a structure is much smaller than, for example, the area of contact in a material made of particles having a cubic structure with an edge of the crystal having the dimension of the axes of the hexagonal crystal, in a random distribution. The overall contact of the resistance-determining component in a resistor body determines its resistance value. In this case the resistance value will therefore be low, which means that a relatively small quantity of the rhodate $M_xSr_{1-x}RhO_{4-4.5}$ is required for producing a resistor body having a certain resistance value.

As mentioned above, it is possible to form resistor bodies having a small TCR value using the above-defined lead-strontium rhodate as a resistance-determining component having a positive TCR together with a component having a negative linear TCR.

In one embodiment of the invention, a metal rhodate $M_3'Rh_7O_{15}$, wherein M' is preferably Pb or Sr, as described in the above-mentioned Patent, is used as the resistance-determining component having a negative TCR.

A resistor body is produced from a resistance-material according to the invention by heating a substrate bearing the resistance material so as to remove the temporary binder and form a coherent resistive layer. The temporary binder is volatilized and/or decomposed by heating and the permanent binder provides cohesion by melting, softening or sintering. The permanent binder is, preferably, a low-melting glass but may be a synthetic resin material.

DESCRIPTION OF THE PREFERRED EMBODIMENTS

The invention will now be described with reference to the following examples.

Lead-strontium rhodate $Pb_xSr_{1-x}Rh_2O_{4-4.5}$ was prepared by heating a mixture of PbO, $Sr(NO_3)_2$ and $Rh_2O_3$ in a molar ratio 1:1:1 in air for 2 hours at a temperature of 900° C. The excess of PbO and SrO was dissolved in $HNO_3$. The reaction product obtained consisted of acicular particles which were approximately 10 μm long and 0.1 μm thick. The specific surface area of this reaction product was approximately 8 $m^2/g$. For this composition the value of x in the formula was 0.20.

Acicular Bi-Sr-rhodate (a=20.2 Å and c=3.1 Å) was obtained by heating a mixture of $Bi_2O_3$, $SrCl_2$ and $Rh_2O_3$ in a molar ratio 3:9:2 for 3 hours in air at a temperature of 1050° C. After cooling the unreacted excesses of Bi and Sr compounds were removed by dissolving them in $HNO_3$. The value of x in the formula for the Bi-Sr-rhodate was 0.30.

The above described rhodate powders were mixed in different ratios with glass powder having an average particle size of 1 μm. Thereafter, the mixtures were made into pastes by means of the addition of benzyl benzoate and ethyl cellulose.

The glass powders used had the following compositions, (expressed in a % by weight), defined in Table I.

The pastes were spread onto sintered alumina plates and were dried in air. Thereafter, the plates were fired in air for 15 minutes at the temperatures specified in Table II. The layers obtained were approximately 20 μm thick.

Table II shows some mixing ratios and the results obtained therewith. Herein m represents the content of $Pb_xSr_{1-x}Rh_2O_{4-4.5}$ in the total oxidic mixture without a temporary binder.

TABLE I

| | 1 | 2 | 3 | 4 |
|---|---|---|---|---|
| PbO | 72.0 | 54.8 | 44.4 | 36.0 |
| SrO | — | 12.7 | 20.5 | — |
| $SiO_2$ | 20.6 | 24.2 | 26.1 | 20.6 |
| $B_2O_3$ | 5.0 | 5.6 | 6.1 | 5.0 |
| $Al_2O_3$ | 2.4 | 2.7 | 2.9 | 2.4 |
| $Bi_2O_3$ | — | — | — | 36.0 |

TABLE II

| glass type | m wt. % | firing temp. °C. | R□ (Ohms/ square) | TCR $10^{-6}$/°C. |
|---|---|---|---|---|
| 1 | 50 | 700 | 18 | +220 |
| 1 | 33 | 700 | 22 | +160 |
| 1 | 25 | 700 | 40 | +110 |
| 1 | 20 | 700 | 85 | +170 |
| 1 | 14 | 700 | 340 | +40 |
| 1 | 12 | 700 | 790 | +10 |
| 1 | 9 | 700 | 1200 | −80 |
| 2 | 33 | 850 | 52 | +200 |
| 2 | 12 | 850 | 400 | +110 |
| 3 | 20 | 850 | 210 | +150 |
| 3 | 14 | 850 | 300 | +75 |
| 3 | 12 | 850 | 760 | −50 |

Table III relates to three resistor bodies made from resistance materials which each contained a negative TCR resistance-determining component with/without a positive TCR resistance-determining component.

TABLE III

| glass type | wt. % glass | resistance material (weight ratio) | firing temp. (°C.) | R□ (Ohms/ square) | TCR $10^{-6}$/°C. |
|---|---|---|---|---|---|
| 1 | 75 | PbSr—rhodate: $Pb_3Rh_7O_{15}$ 4:1. | 750 | 75 | −100 |
| 4 | 50 | PbSr—rhodate: BiSr—rhodate 1:1 | 750 | 29 | +30 |
| 4 | 50 | Bi—Sr—rhodate only | 750 | 92 | −390 |

What is claimed is:

1. A resistance material comprising at least one compound having the formula $M_xSr_{1-x}Rh_2O_{4-4.5}$ wherein M is selected from the group consisting of Pb and Bi, and wherein x is between 0 and ½.

2. A resistance material as claimed in claim 1, wherein x is between 0.05 and 0.45.

3. A resistor comprising a resistor body provided with leads, said resistor body comprising a resistance material as claimed in claim 1 or 2.

4. A resistance material comprising a mixture of a permanent binder, a temporary binder, and a resistance-determining component, said resistance-determining component comprising at least one compound having the formula $M_xSr_{1-x}Rh_2O_{4-4.5}$ wherein M is selected from the group consisting of Pb and Bi, and wherein x is between 0 and ½.

5. A resistance material as claimed in claim 4, wherein x is between 0.05 and 0.45.

6. A resistance material as claimed in claim 1, 2, 4, or 5, wherein the material comprises at least two such compounds, at least one of the compounds having a negative temperature coefficient of resistance, at least one other compound having a positive temperature coefficient of resistance, the ratio of these two compounds being chosen to achieve a desired temperature coefficient of resistance.

7. A resistance material as claimed in claim 1, 2, 4 or 5, wherein M and Pb and wherein the material further comprises a substance having a negative temperature coefficient of resistance, said substance being a metal rhodate having a composition defined by the formula $M'_3Rh_7O_{15}$, wherein M' is Pb or Sr.

8. A resistor comprising a resistor body provided with leads, said resistor body comprising a substrate bearing a resistance material as claimed in claim 9 or 10, said resistor body having been produced by heating the substrate and the resistance material so as to remove the temporary binder and form a coherent resistive layer.

* * * * *

UNITED STATES PATENT AND TRADEMARK OFFICE
CERTIFICATE OF CORRECTION

PATENT NO. : 4,303,742

DATED : December 1, 1981

INVENTOR(S) : ALEXANDER H. BOONSTRA ET AL

It is certified that error appears in the above—identified patent and that said Letters Patent is hereby corrected as shown below:

Claim 8, Line 3, change "9 or 10" to --4 or 5--.

Signed and Sealed this

*Fourteenth* Day of *June 1983*

[SEAL]

*Attest:*

DONALD J. QUIGG

*Attesting Officer* *Acting Commissioner of Patents and Trademarks*